United States Patent
Oka (10) Patent No.: US 11,714,234 B2
(45) Date of Patent: Aug. 1, 2023

(54) OPTICAL WAVEGUIDE DEVICE THAT CONVERTS POLARIZATION OF LIGHT

(71) Applicant: Fujitsu Optical Components Limited, Kawasaki (JP)

(72) Inventor: Akira Oka, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 82 days.

(21) Appl. No.: 17/521,050

(22) Filed: Nov. 8, 2021

(65) Prior Publication Data

US 2022/0206219 A1    Jun. 30, 2022

(30) Foreign Application Priority Data

Dec. 25, 2020    (JP) .................................. 2020-216278

(51) Int. Cl.
*G02B 6/126*    (2006.01)
(52) U.S. Cl.
CPC .................................. *G02B 6/126* (2013.01)
(58) Field of Classification Search
CPC ..................................................... G02B 6/126
See application file for complete search history.

(56) References Cited

U.S. PATENT DOCUMENTS

| 9,523,820 B1 | 12/2016 | Vermeulen |
| 2008/0019637 A1* | 1/2008 | Little .................... G02B 27/283 385/28 |
| 2016/0178842 A1* | 6/2016 | Goi ........................ G02B 6/126 385/11 |
| 2017/0023735 A1* | 1/2017 | Barwicz ............... G02B 6/2773 |
| 2017/0176677 A1 | 6/2017 | Oka |
| 2017/0176679 A1* | 6/2017 | Oka ........................ H04J 14/06 |

FOREIGN PATENT DOCUMENTS

| JP | 6320573 B2 | 5/2018 |
| WO | 2016/052344 A1 | 4/2016 |
| WO | 2016/117532 A1 | 7/2016 |

* cited by examiner

*Primary Examiner* — Chris H Chu
(74) *Attorney, Agent, or Firm* — Staas & Halsey LLP (57) ABSTRACT

An optical waveguide device includes a pair of waveguides. One of the waveguides includes a first core formed in a conversion region and a third core formed in an exit region. The other of waveguides includes a second core formed in the conversion region and a fourth core formed in the exit region. Cross-sectional areas of the first and second cores are different from each other at an input end. Distributions of a refractive index of the first and second cores are respectively asymmetric in a perpendicular direction. A quantitative relation provided at the input end between an effective refractive index of an odd mode of TE0 and an effective refractive index of an even mode of TM0 is opposite to the quantitative relation provided at the output end. Cross-sectional areas of the third and fourth cores are different from each other at an output end.

10 Claims, 10 Drawing Sheets

OPTICAL WAVEGUIDE DEVICE THAT CONVERTS POLARIZATION OF LIGHT

CROSS-REFERENCE TO RELATED APPLICATION

This application is based upon and claims the benefit of priority of the prior Japanese Patent Application No. 2020-216278, filed on Dec. 25, 2020, the entire contents of which are incorporated herein by reference.

FIELD

The embodiments discussed herein are related to an optical waveguide device that converts the polarization of light.

BACKGROUND

In recent years, polarization multiplexing has been widespread to increase the capacity of optical communication systems. Polarization multiplexing can transmit independent information by using a pair of polarization components orthogonal to each other.

As a general rule, an optical transceiver used for coherent optical communication includes an optical waveguide device having a waveguide formed on a substrate. There may be a TE-like mode (hereinafter, "TE mode") and a TM-like mode (hereinafter, "TM mode") orthogonal to each other in the waveguide formed on the substrate. The main component of the electric field of the TE mode is parallel to the substrate. The main component of the electric field of the TM mode is perpendicular to the substrate.

However, the TE mode and the TM mode are different from each other in terms of characteristics such as effective refractive index and confinement of light in the core of the waveguide. Thus, for example, TM-mode light may be converted into TE-mode light and then processed on the substrate. The processed TE-mode light may be converted into TM-mode light and then transmitted. Accordingly, optical circuits that process a polarization multiplexed optical signal include, in many cases, an optical waveguide device that performs polarization conversion between the TE mode and the TM mode.

For example, an optical waveguide device that performs polarization conversion may include a pair of waveguides formed close to each other and parallel to each other. The pair of waveguides are designed such that polarization components orthogonal to each other (e.g., TE0 and TM0) interact with each other. For example, the waveguide through which TM0-mode light is propagated may have a cross section with an asymmetrical shape. Thus, the polarization plane of the TM0-mode light is inclined, resulting in evanescent light being transferred to the other waveguide. As a result, TE0-mode light is generated in the other waveguide. Optical waveguide devices that perform polarization conversion are described in, for example, U.S. Pat. No. 9,523,820 and Japanese Patent No. 6320573. Relevant techniques are described in International Publication Pamphlet No. WO 2016/052344 and International Publication Pamphlet No. WO 2016/117532.

As described above, known optical waveguide devices perform polarization conversion between the TE0 mode and the TE0 mode by inclining the polarization plane of input light. However, as a general rule, the electric field of evanescent light is weak, and the interaction between the TM0 mode of one waveguide and the TE0 mode of another waveguide is weak. Thus, the efficiency of conversion is low. Hence, a pair of waveguides need to be long to sufficiently transfer energy from one polarization to another. As a result, an optical waveguide device for performing polarization conversion will be large-sized.

SUMMARY

According to an aspect of the embodiments, an optical waveguide device includes a pair of waveguides formed parallel to each other. One of the pair of waveguides includes a first core formed in a conversion region and a third core formed in a light exit region. The other of the pair of waveguides includes a second core formed in the conversion region and a fourth core formed in the light exit region. A cross-sectional area of the first core and a cross-sectional area of the second core are different from each other at an input end of the conversion region. I at least a portion of a section between the input end and an output end of the conversion region, a distribution of a refractive index on a cross section of at least one of the first core and the second core is asymmetric in a direction perpendicular to a surface of a substrate on which the pair of waveguides are formed. A quantitative relation provided at the input end of the conversion region between an effective refractive index of an odd mode of TE0 and an effective refractive index of an even mode of TM0 is opposite to a quantitative relation provided at the output end of the conversion region between the effective refractive index of the odd mode of TE0 and the effective refractive index of the even mode of TM0. A structure of the first core and a structure of the second core each continuously change in a light traveling direction. A distribution of a refractive index on a cross section of the third core and a distribution of a refractive index on a cross section of the fourth core are each symmetric in the direction perpendicular to the surface of the substrate. A structure of the third core and a structure of the fourth core each continuously change in the light traveling direction. A cross-sectional area of the third core and a cross-sectional area of the fourth core are different from each other at an output end of the light exit region.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
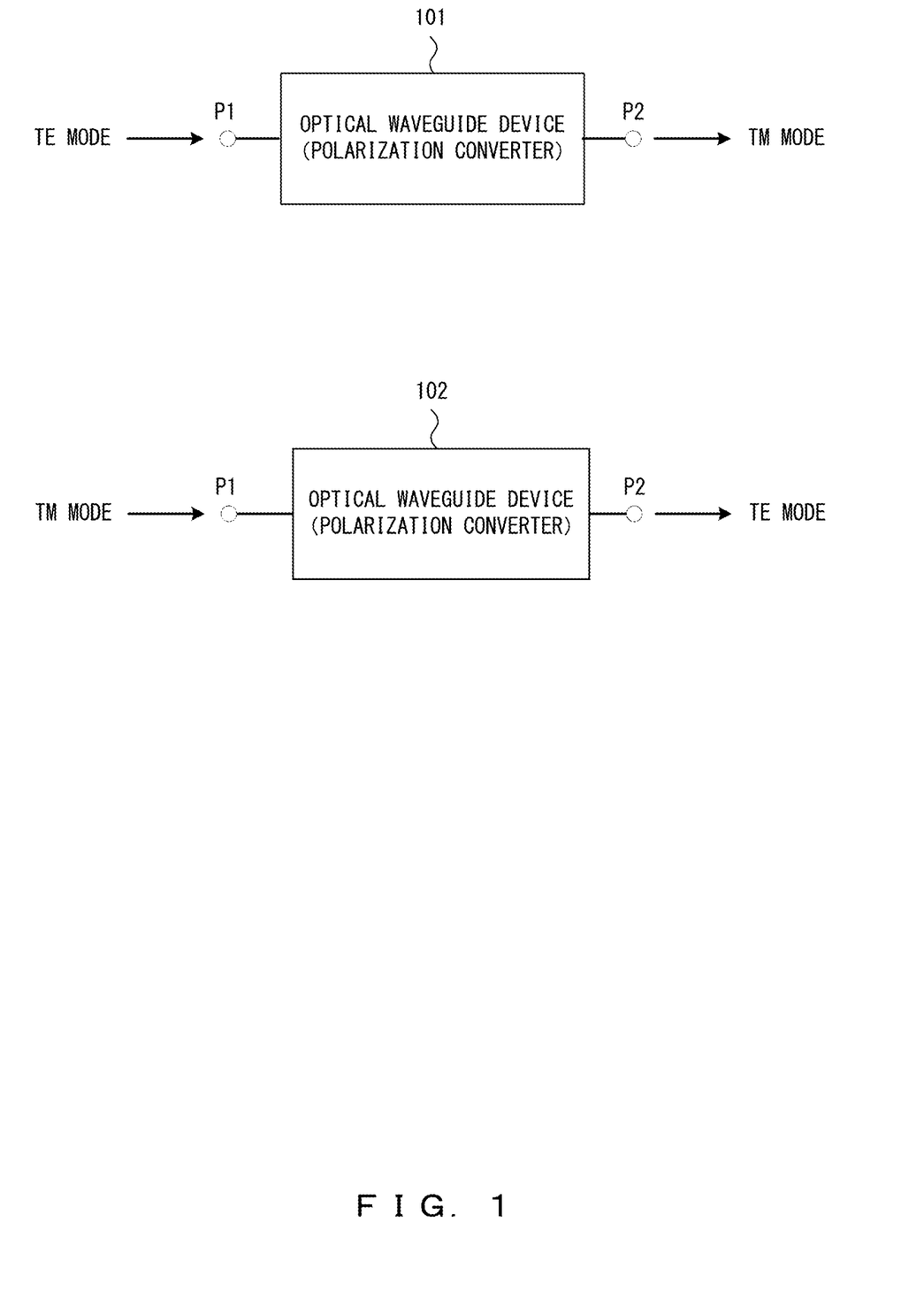
FIG. 1 illustrates polarization conversion functions provided by optical waveguide devices.

FIG. 1 illustrates polarization conversion functions provided by optical waveguide devices. An optical waveguide device in accordance with embodiments of the present invention performs conversion between a transverse electric (TE) mode and a transverse magnetic (TM) mode. Thus, the optical waveguide device in accordance with embodiments of the present invention is operated as a polarization converter. The main component of the electric field of the TE mode is, with respect to a cross section perpendicular to a light traveling direction, horizontal to a substrate on which the optical waveguide device is formed. The main component of the electric field of the TM mode is, with respect to a cross section perpendicular to the light traveling direction, perpendicular to the substrate on which the optical waveguide device is formed.

The optical waveguide device 101 converts the TE mode into the TM mode. In particular, when TE-mode light is input via a port P1 of the optical waveguide device 101, TM-mode light will be output from a port P2 of the optical waveguide device 101. The optical waveguide device 102 converts the TM mode into the TE mode. In particular, when TM-mode light is input via a port P1 of the optical waveguide device 102, TE-mode light will be output from a port P2 of the optical waveguide device 102. However, the optical waveguide devices can perform an invertible operation. In particular, when TM-mode light is input via the port P2 of the optical waveguide device 101, TE-mode light will be output from the port P1 of the optical waveguide device 101. When TE-mode light is input via the port P2 of the optical waveguide device 102, TM-mode light will be output from the port P1 of the optical waveguide device 102.

Figure 2A:
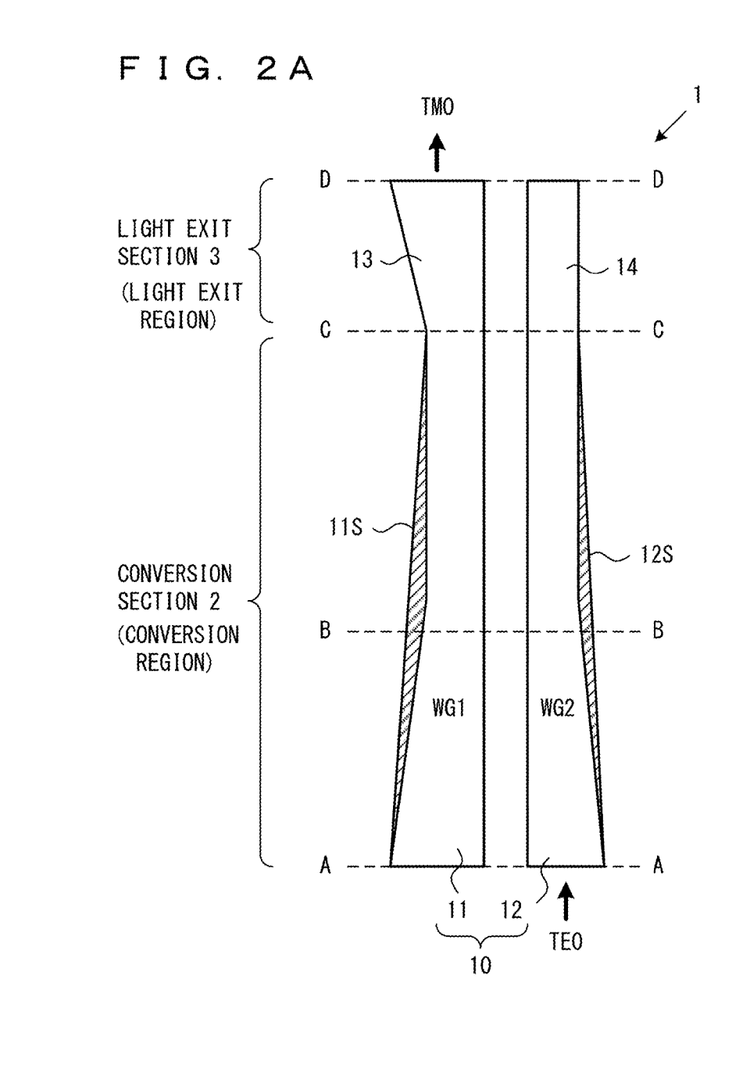
FIGS. 2A and 2B illustrate an example of an optical waveguide device in accordance with embodiments of the present invention.
Figure 2B:
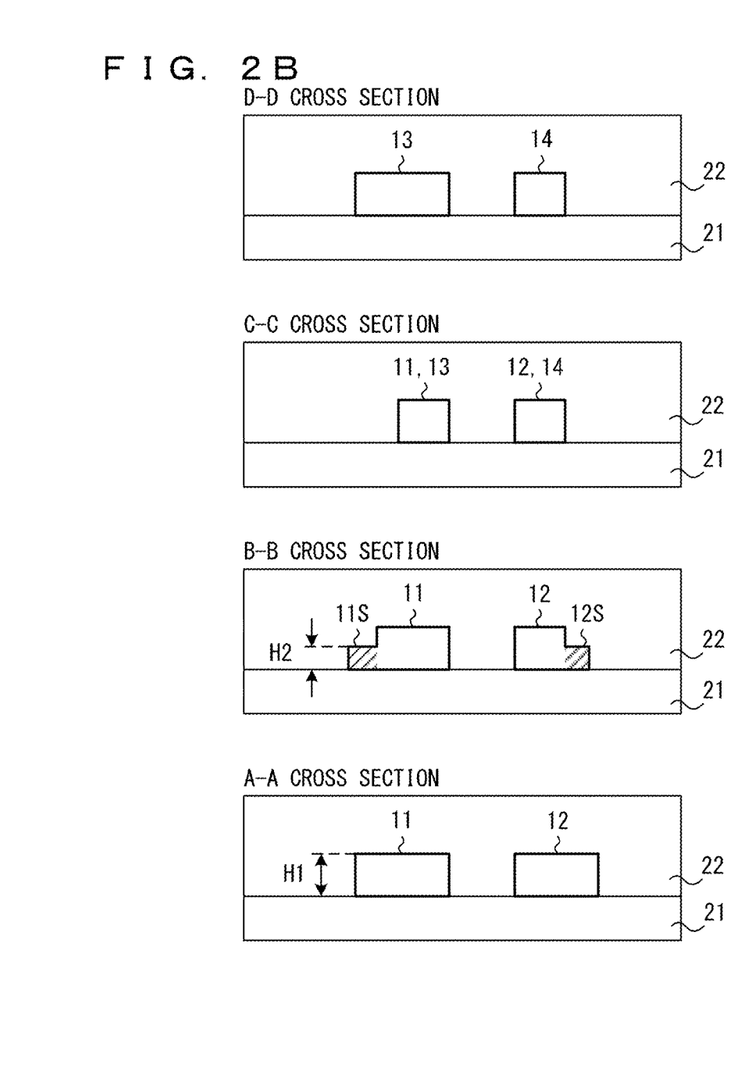

FIGS. 2A and 2B illustrate an example of an optical waveguide device in accordance with embodiments of the present invention. In this example, an optical waveguide device 1 converts a TE0 mode into a TM0 mode. However, the optical waveguide device 1 can perform an invertible operation. Thus, the optical waveguide device 1 can also convert the TM0 mode into the TE0 mode. For example, the optical waveguide device 1 may be formed on a silicon substrate by using a silicon photonics technique.

As depicted in FIG. 2A, the optical waveguide device 1 includes a pair of waveguides WG1 and WG2 formed adjacent to each other and parallel to each other. Each of the waveguides WG1 and WG2 is formed from a core and cladding. The refractive index of the core is higher than that of the cladding. The core is formed from, for example, Si, and the cladding is formed from, for example, SiO2. Note that the core of a waveguide may hereinafter be referred to as a "waveguide." For example, WG1 and WG2 in FIG. 2A indicate the cores of the waveguides.

The optical waveguide device 1 includes a conversion section (conversion region) 2 and a light exit section (light exit region) 3. The conversion section 2 converts the polarization mode of input light. The light exit section 3 extracts the light for which the polarization mode has been converted by the conversion section 2.

The waveguide WG1 is formed from a core 11 belonging to the conversion section 2 and a core 13 belonging to the light exit section 3. The waveguide WG2 is formed from a core 12 belonging to the conversion section 2 and a core 14 belonging to the light exit section 3. Thus, the cores 11 and 12 formed adjacent to each other and parallel to each other are provided in the conversion section 2. The cores 13 and 14 formed adjacent to each other and parallel to each other are provided in the light exit section 3. The cores 11 and 13 are formed continuous with each other, and the cores 12 and 14 are formed continuous with each other. Note that when the cores 11 and 12 are deemed as one waveguide core, the waveguide core may be referred to as a "core 10."

FIG. 2B depicts cross sections of the optical waveguide device 1 illustrated in FIG. 2A. As described above, the waveguide is formed from a core and cladding. As depicted in FIG. 2B, for example, the cores 11-14 may each be surrounded by a lower cladding 21 and an upper cladding 22.

Cross sections of the cores 11 and 12 are shaped like rectangles at the input end of the conversion section 2 (i.e., A-A cross section, the input ends of the cores 11 and 12, the input ends of the waveguides WG1 and WG2). A "rectangle" may be a shape that can be deemed as a rectangle from a macroscopic viewpoint. Thus, a "rectangle" may be, for example, a trapezoid or a shape having a rounded corner due to a manufacturing process. The cores 11 and 12 have the same height H1. The width of the core 11 is different from that of the core 12. In this example, the core 12 has a smaller width than the core 11. Thus, the core 12 has a smaller cross-sectional area than the core 11. The cores 11-14 have constant heights over the entire region.

Cross sections of the cores 11 and 12 are also shaped like rectangles at the output end of the conversion section 2 (i.e., C-C cross section, the output ends of the cores 11 and 12). However, at this position, the width of the core 11 may be the same as or different from that of the core 12. In this example, the width of the core 11 is the same as that of the core 12.

The cores 11 and 12 each include a slab in a region between the input end and the output end of the conversion section 2 (i.e., B-B cross section, the regions between the input ends and the output ends of the cores 11 and 12). In particular, the core 11 includes a slab 11S, and the core 12 includes a slab 12S. The slabs 11S and 12S are formed from the same material as the cores 11 and 12. However, the slabs 11S and 12S have a height H2, which is less than H1.

As described above, the cores 11 and 12 each include a slab in the region between the input end and the output end of the conversion section 2. Hence, the shape of cross sections of each of the cores 11 and 12 are asymmetric in a direction perpendicular to the surface of the substrate on which the optical waveguide device 1 is formed (i.e., vertically asymmetric). As a result, the distribution of the refractive index on any cross section of each of the cores 11 and 12 may be asymmetric in the direction perpendicular to the surface of the substrate on which the optical waveguide device 1 is formed (i.e., vertically asymmetric).

The shape depicted in FIG. 2A is one example, and the present invention is not limited to this configuration. In particular, the optical waveguide device 1 may be configured such that either of the cores 11 and 12 includes a slab. Alternatively, the cores 11 and 12 do not need to include a slab throughout the entirety of the section between the input end and the output end of the conversion section 2, and may include a slab only in a portion of the section between the input end and the output end of the conversion section 2. However, the cross-sectional shape of each of the cores 11 and 12 preferably varies continuously between the input end and the output end. Hence, the width of each of the slabs 11S and 12S preferably varies continuously between the input end and the output end. In the example depicted in FIG. 2A, the width of each of the slabs 11S and 12S gradually increases from zero in the direction from the input end toward the output end and then gradually decreases to zero in this direction.

The cross sections of the cores 13 and 14 are shaped like rectangles at the output end of the light exit section 3 (i.e., D-D cross section, the output ends of the cores 13 and 14, the output ends of the waveguides WG1 and WG2). However, the width of the core 13 is different from that of the core 14. In this example, the core 13 has a larger width than the core 14. Thus, the core 13 has a larger cross-sectional area than the core 14. Meanwhile, the width of the core 13 gradually increases toward the output end. Hence, the cross-sectional area of the core 13 gradually increases toward the output end. The width of the core 14 is constant.

TE0-mode light is input to the optical waveguide device 1. The conversion section 2 converts the TE0-mode light into an odd mode of TE0 and then into an even mode of TM0. Then, the light exit section 3 extracts TM0-mode light.

TE0 indicates a mode with the highest effective refractive index among TE modes guided through an isolated waveguide (e.g., an external waveguide connected to the input side of the optical waveguide device 1). The even mode of TE0 indicates a mode with the highest effective refractive index among TE modes guided through two waveguides in parallel (in this example, the cores 11 and 12). The odd mode of TE0 indicates a mode with the second highest effective refractive index among the TE modes guided through two waveguides in parallel (in this example, the cores 11 and 12). TM0 indicates a mode with the highest effective refractive index among TM modes guided through an isolated waveguide (e.g., an external waveguide connected to the output side of the optical waveguide device 1). The even mode of TM0 indicates a mode with the highest effective refractive index among TM modes guided through two waveguides in parallel (in this example, the cores 11 and 12).

The optical waveguide device 1 is preferably designed to satisfy the following conditions (1)-(5).

(1) The effective refractive index of the TE0 mode at the input end of the core 12 that would be obtained assuming that the core 11 is not present is lower than the effective refractive index of the TE0 mode at the input end of the core 11 that would be obtained assuming that the core 12 is not present. However, the effective refractive index of the TE0 mode at the input end of the core 12 that would be obtained assuming that the core 11 is not present may be higher than the effective refractive index of the TE0 mode at the input end of the core 11 that would be obtained assuming that the core 12 is not present. In this case, TE0 is input to the core 11 in order to attain the function of polarization conversion. Note that the expression "the core 11 is not present" means that "the core 12 is isolated," and the expression "the core 12 is not present" means that "the core 11 is isolated." Meanwhile, the expression "the core 11 is not present" means that the entirety of the region where the core 11 would be formed has the same refractive index as the cladding 22, and the expression "the core 12 is not present" means that the entirety of the region where the core 12 would be formed has the same refractive index as the cladding 22.

(2) Assuming that the cores 11 and 12 are each an isolated core, on any cross section between the input end and the output end of the conversion section 2, the effective refractive index of the TE0 mode guided through one of the cores is always higher than the effective refractive index of the TM0 mode guided through the other core.

(3) The quantitative relation between the odd mode of TE0 and the even mode of TM0 at the input end of the conversion section 2 is opposite to the quantitative relation between the odd mode of TE0 and the even mode of TM0 at the output end of the conversion section 2.

(4) In an interaction region in the conversion section 2 in which the odd mode of TE0 and the even mode of TM0 interact with each other, the refractive index distribution on a cross section perpendicular to the direction in which light propagates is vertically asymmetric.

(5) At the output end of the light exit section 3, the cross-sectional area of one of the cores (e.g., core 13) is larger than that of the other (e.g., core 14).

The condition (1) can be satisfied by making the cross-sectional area of the core 12 smaller than that of the core 11 at the input end of the conversion section 2 (i.e., the input ends of the waveguides WG1 and WG2). In an example, the condition (1) is satisfied by making the width of the input end of the core 12 smaller than the width of the input end of the core 11. In the case of the same waveguide mode, enlarging a cross-sectional area of a core increases the effective refractive index because the electric field of light is strongly confined in the core. By contrast, narrowing a cross-sectional area of the core decreases the effective refractive index.

Figure 3A:
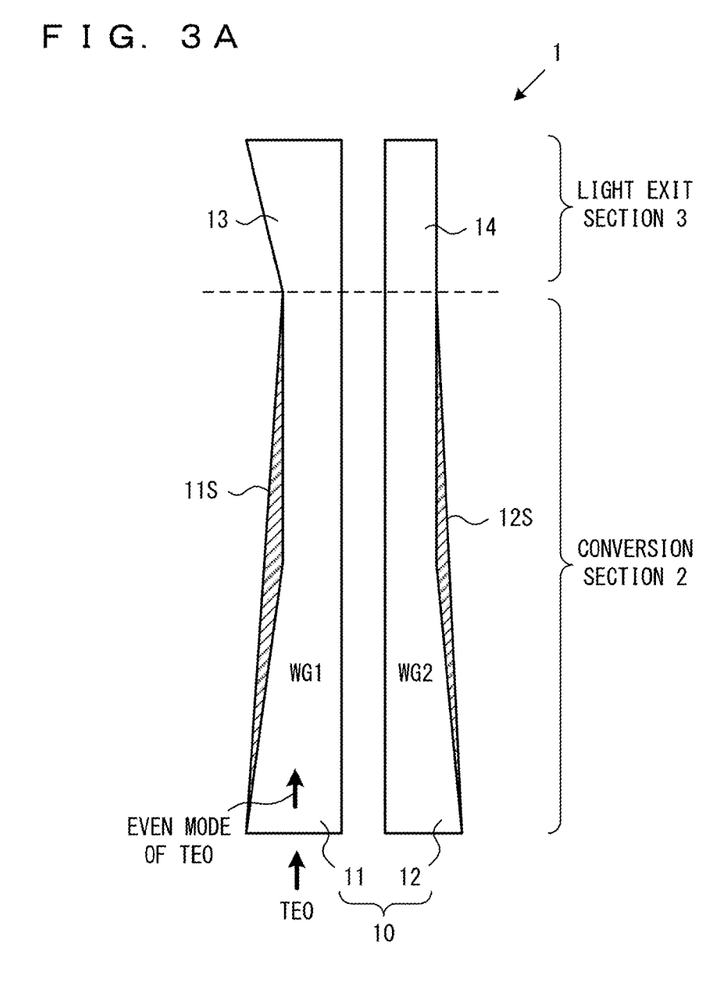
FIGS. 3A and 3B illustrate an example of mode conversion implemented when TE0-mode light is input to a conversion section.
Figure 3B:
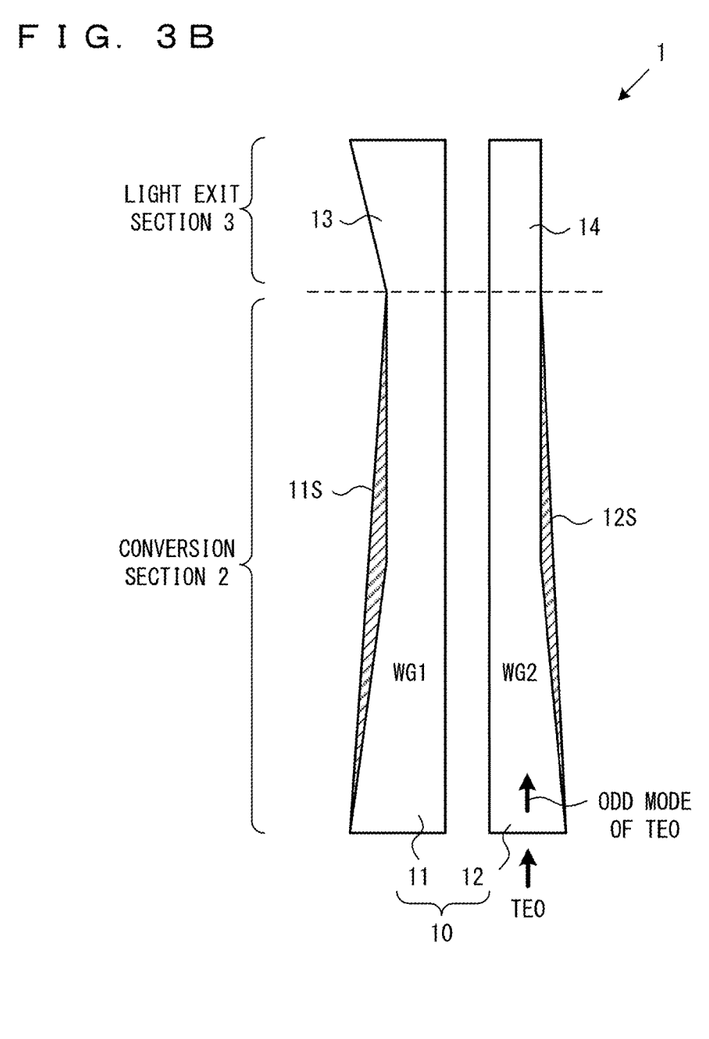

FIGS. 3A and 3B illustrate an example of mode conversion implemented when TE0-mode light is input to the conversion section 2. In a case where the effective refractive indexes at the input ends of the cores 11 and 12 are the same, when TE0-mode light is input to the conversion section 2, a large proportion of the electric field of the input light is distributed over the two cores. In a case where the effective refractive indexes at the input ends of the cores 11 and 12 are different, the electric field of the input light tends to be localized in one of the cores. In this case, the lower-order mode (i.e., the even mode of TE0) tends to be localized in a core among the cores 11 and 12 that has a higher effective refractive index. The higher-order mode (i.e., the odd mode of TE0) tends to be localized in a core among the cores 11 and 12 that has a lower effective refractive index. Note that the effective refractive index of the odd mode is always lower than that of the even mode.

Accordingly, when the condition (1) is satisfied, inputting TE0-mode light to the core 11 causes the even mode of TE0 to be localized in the core 11, as depicted in FIG. 3A. Thus, the waveguide mode of the input light is converted from TE0 into the even mode of the TE0 mode. Then, the even mode of TE0 is guided through the core 11. Meanwhile, inputting TE0-mode light to the core 12 causes the odd mode of TE0 to be localized in the core 12, as depicted in FIG. 3B. Thus, the waveguide mode of the input light is converted from the TE0 mode into the odd mode of TE0. Then, the odd mode of TE0 is guided through the core 12. Note that the odd mode of TE0 is substantially equivalent to the TE1 mode.

The condition (2) can be satisfied by appropriately designing the shape of the cores 11 and 12. The effective refractive index of each waveguide mode is dependent on the shape of a cross section of the core (in particular, the area of a cross section of the core).

Figure 4A:
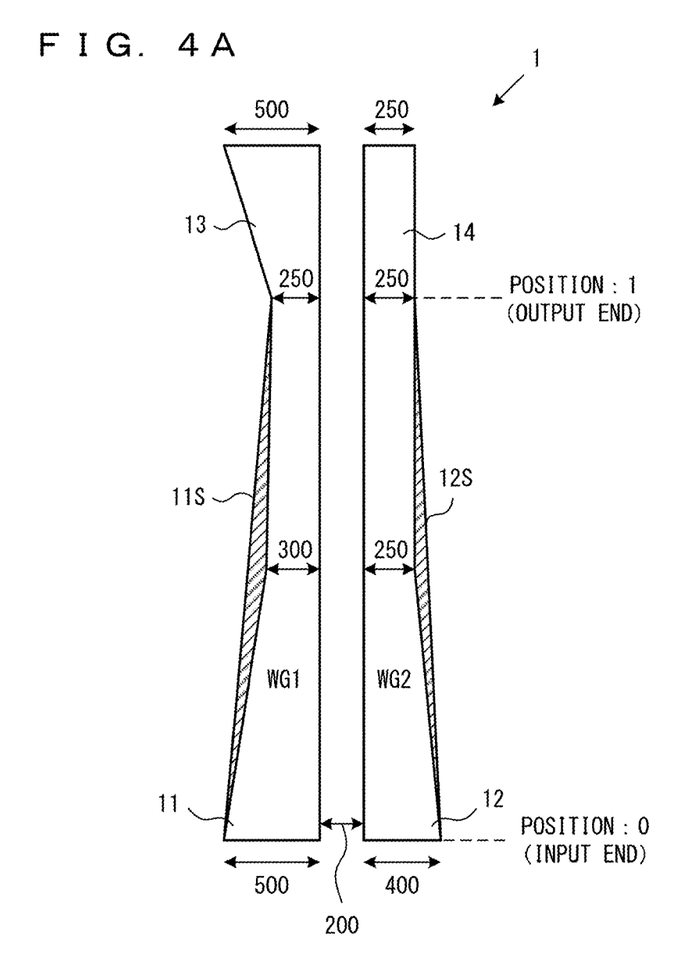
FIGS. 4A and 4B illustrate an example of the shapes of cores and effective refractive indexes of TE0 and TM0.
Figure 4B:
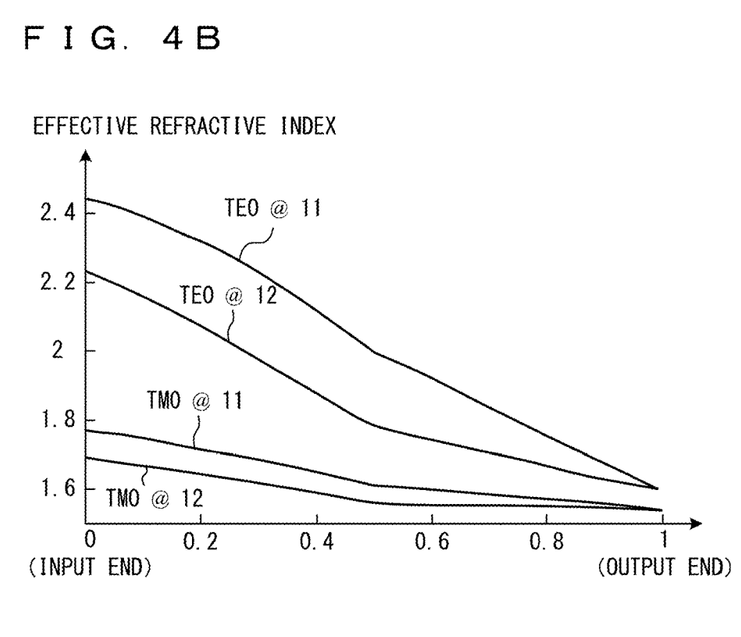

FIGS. 4A and 4B illustrate an example of the shapes of cores and effective refractive indexes of TE0 and TM0. In this example, the optical waveguide device 1 is formed to have the size indicated in FIG. 4A. In particular, the widths of the cores 11 and 12 at the input end of the conversion section 2 are respectively 500 nm and 400 nm. The widths of the cores 11 and 12 at the output end of the conversion section 2 are respectively 250 nm and 250 nm. The widths of the cores 11 and 12 at the midpoint between the input end and the output end of the conversion section 2 are respectively 300 nm and 250 nm. Accordingly, the core 11 has a tapered shape such that the width decreases in the direction from the input end toward the midpoint and also decreases in the direction from the midpoint toward the output end. The core 12 has a tapered shape such that the width decreases in the direction from the input end toward the midpoint, but the width is constant in the direction from the midpoint toward the output end. The spacing between the cores 11 and 12 is 200 nm.

The widths of the cores 13 and 14 at the output end of the light exit section 3 are respectively 500 nm and 250 nm. Accordingly, the core 13 is has a tapered shape such that the width increases in the direction from the input end toward the output end of the light exit section 3. The width of the core 14 is constant. The spacing between the cores 13 and 14 is 200 nm. The cores 11-14 have a height H1 of 220 nm. The slabs 11S and 12S have a height H2 of 105 nm.

FIG. 4B illustrates the effective refractive indexes of TE0 and TM0 in the cores 11 and 12. The horizontal axis indicates positions between the input ends and the output ends of the cores 11 and 12 and has been normalized. This example is based on the assumption that the cores 11 and 12 are each isolated. Thus, TE0@11 indicates the effective refractive index of the TE0 mode in the core 11 assuming that the core 11 is isolated, and TE0@12 indicates the effective refractive index of the TE0 mode in the core 12 assuming that the core 12 is isolated. TM0@11 indicates the effective refractive index of the TM0 mode in the core 11 assuming that the core 11 is isolated, and TM0@12 indicates the effective refractive index of the TE0 mode in the core 12 assuming that the core 12 is isolated.

As indicated above, TE0@11 can be always higher than TM0@12 at any cross section. TE0@12 can be always higher than TM0@11 at any cross section.

The condition (3) can be satisfied by appropriately designing the shape of the cores 11 and 12. The effective refractive index of each waveguide mode is dependent on the shape of a cross section of the core (in particular, a cross-sectional area of the core). Thus, appropriately determining the widths for the cores 11 and 12 by means of a simulation or the like allows an optical waveguide device 1 satisfying the condition (3) to be designed. The condition (4) is satisfied by forming the slabs 11S and 12S. Satisfying the conditions (3) and (4) allows for attainment of efficient conversion from the odd mode of TE0 to the even mode of TM0. The reason for this is described in, for example, Japanese Patent No. 6320573.

If the condition (4) is not satisfied (i.e., the slabs 11S and 12S are not formed), the distribution of the refractive index on a cross section of the conversion section 2 that is perpendicular to the direction in which light propagates is vertically symmetric. In this case, the main component of the electric field of the odd mode of TE0 is orthogonal to the main component of the electric field of the even mode of TM0, so interaction is unlikely to occur between the odd mode of TE0 and the even mode of TM0 even when the condition (3) is satisfied. In view of this, the configuration satisfying the condition (4) is attained by providing the slabs 11S and 12S.

By contrast, in a case where the conditions (3) and (4) are satisfied, the interaction region in which the odd mode of TE0 and the even mode of TM0 interact with each other is such that the distribution of the refractive index on a cross section of the interaction region that is perpendicular to the direction in which light propagates is vertically asymmetric. In this regard, as described above, the condition (4) is satisfied by forming the slabs 11S and 12S. That is, forming the slabs in the interaction region allows the condition (4) to be satisfied. However, if the core has a discontinuous shape in the direction in which light propagates, the communication quality will be reduced due to scattering or the like. Thus, as depicted in FIG. 2A, in the optical waveguide device 1, the slabs 11S and 12S are formed to have a width that continuously changes.

When the distribution of the refractive index of the cores 11 and 12 is vertically asymmetric, the orientation of the electric field of each waveguide mode tilts. In this case, the main component of the electric field of the odd mode of TE0 is not orthogonal to the main component of the electric field of the even mode of TM0. Thus, the odd mode of TE0 and the even mode of TM0 are strongly interacted. As a result, a high efficiency of conversion is attained between the odd mode of TE0 and the even mode of TM0, and the even mode of TM0 emerges at the output end of the conversion section 2.

The condition (5) can be satisfied by making one of the cores has a larger width than the other at the output end of the optical waveguide device 1. In this example, at the output end, the core 13 has a larger width than the core 14.

Figure 5:
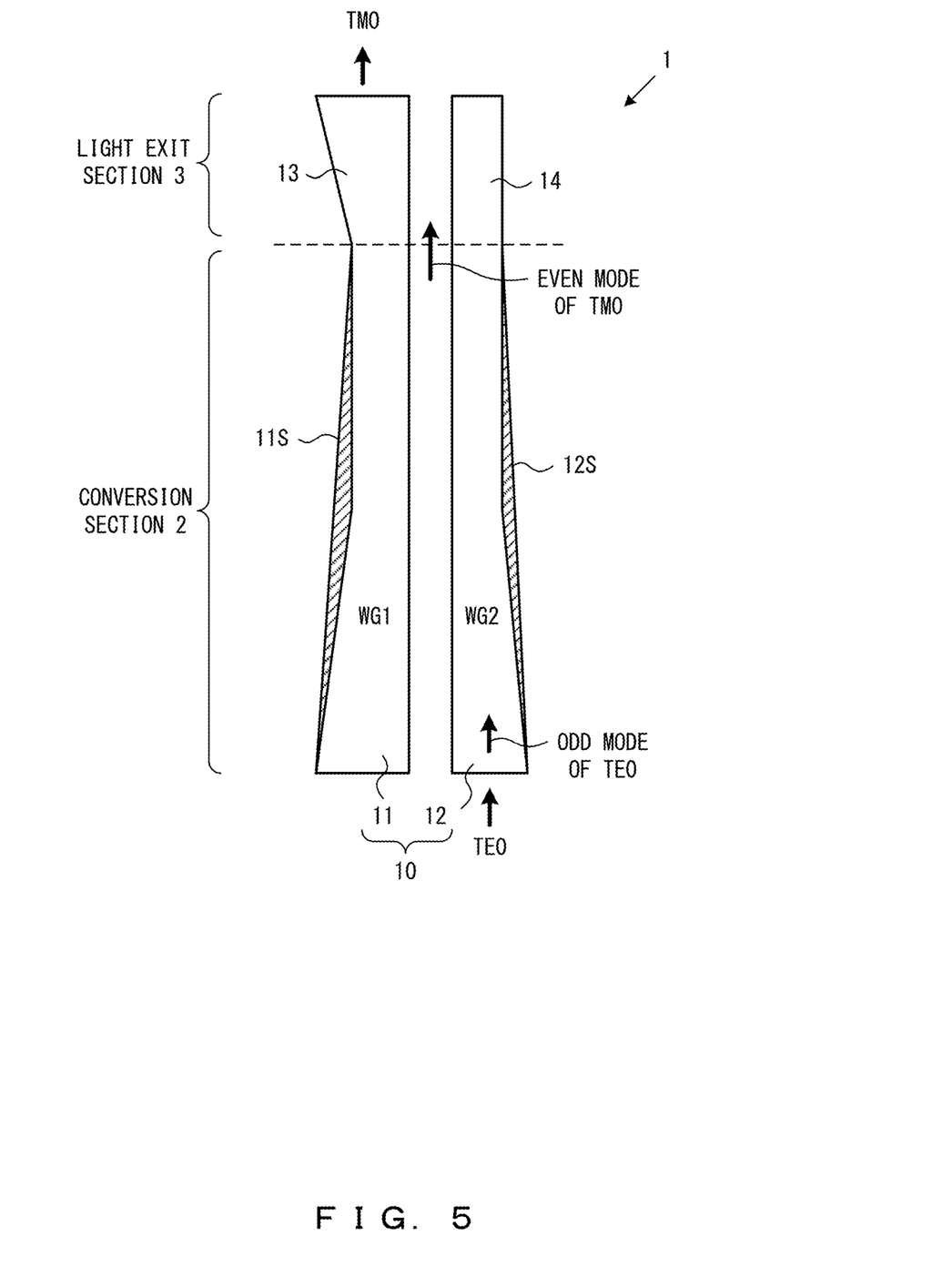
FIG. 5 is an explanatory diagram for extraction of TM0-mode light.

FIG. 5 is an explanatory diagram for extraction of TM0-mode light. In this example, as described above, the odd mode of TE0 is converted into the even mode of TM0 by the conversion section 2. Thus, even-mode light of TM0 is input from the conversion section 2 to the light exit section 3. However, the electric field of the even mode of TM0 is distributed over the cores 13 and 14 at the input end of the light exit section 3.

The width of the core 13 continuously increases toward the output end. Meanwhile, the width of the core 14 is constant. Thus, at the output end, the core 13 has a larger cross-sectional area than the core 14. In this regard, when light propagates through a pair of cores parallel to each other, the even mode is localized in the core having a larger cross-sectional area. Hence, the electric field of the TM0 mode is localized in the core 13 at the output end of the optical waveguide device 1.

When a core has a cross section with a vertically and horizontally asymmetric shape, conversion between the even mode of TM0 and the odd mode of TE0 may occur. Thus, the cores 13 and 14 each have a cross section shaped like a rectangle. That is, the cores 13 and 14 each have a vertically and horizontally symmetric cross section. Accordingly, the light exit section 3 prevents or suppresses conversion from the even mode of TM0 to the odd mode of TE0.

As described above, the optical waveguide device 1 in accordance with embodiments of the present invention includes the waveguide WG1 (cores 11 and 13) and the waveguide WG2 (cores 12 and 14). When TE0-mode light is input from an isolated waveguide to the core 12, the odd mode of TE0 will be propagated through the conversion section 2. The odd mode of TE0 is converted by the conversion section 2 into the even mode of TM0. In addition, at the output end of the optical waveguide device 1, the electric field of the TM0-mode light is localized in the core 13. Hence, TM0-mode light can be extracted by coupling an isolated waveguide to the output end of the core 13. Accordingly, the optical waveguide device 1 converts TE0-mode light into TM0-mode light.

Conversion between the TE0 mode and the TM0 mode can also be implemented in accordance with the prior art (e.g., patent document 1: U.S. Pat. No. 9,523,820). However, in U.S. Pat. No. 9,523,820, conversion between the TE0 mode and the TM0 mode is performed using a tapered directional coupler. In this regard, assuming that two cores are each isolated in the tapered directional coupler, the effective refractive index of TE0 and the effective refractive index of TM0 intersect each other at a certain point between the input end and the output end. In this case, the TE0 mode and the TM0 mode interact with each other in the vicinity of the intersection point, thereby attaining mode conversion. However, the interaction between the TE0 mode and the TM0 mode is weak. Thus, in order to attain a sufficient interaction in this configuration, the two cores need to be formed in parallel in a long section. Hence, it is difficult to downsize an optical waveguide device.

By contrast, the optical waveguide device 1 in accordance with embodiments of the present invention, which does not use a tapered directional coupler, performs conversion between the odd mode of TE0 (i.e., TE1) and the even mode of TM0 (i.e., TM0), with the two cores formed in parallel being deemed as one cross section. As a general rule, conversion between the TE1 mode and the TM0 mode is more efficient than conversion between the TE0 mode and the TM0 mode. Hence, in the optical waveguide device 1, the section in which the two cores are formed in parallel can be short, so that the optical waveguide device can be downsized. In the meantime, the optical waveguide device 1 preferably satisfies the condition (2). In a configuration in which the condition (2) is satisfied, the effective refractive index of TE0 and the effective refractive index of TM0 are not the same, so direct conversion between TE0 and TM0 does not occur.

Figure 6A:
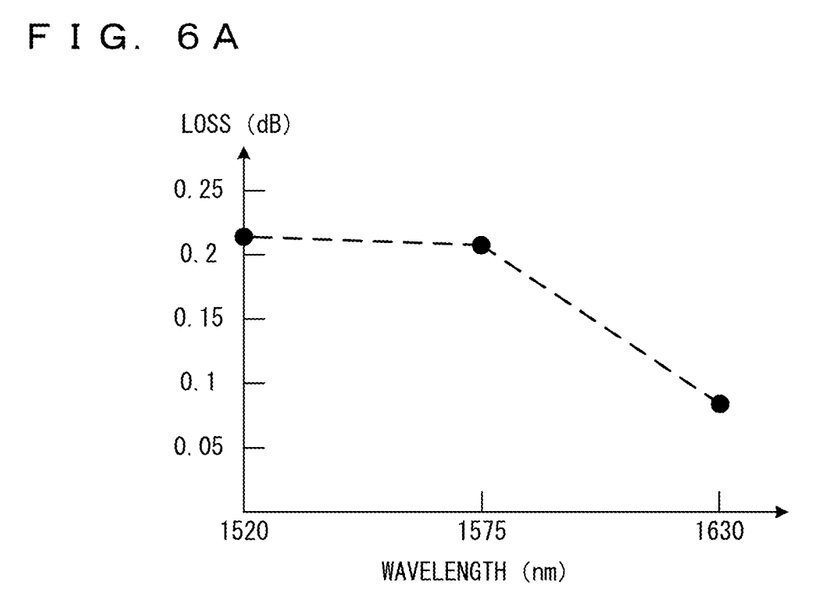
FIGS. 6A and 6B illustrate a simulation result for loss and polarization extinction ratio.
Figure 6B:
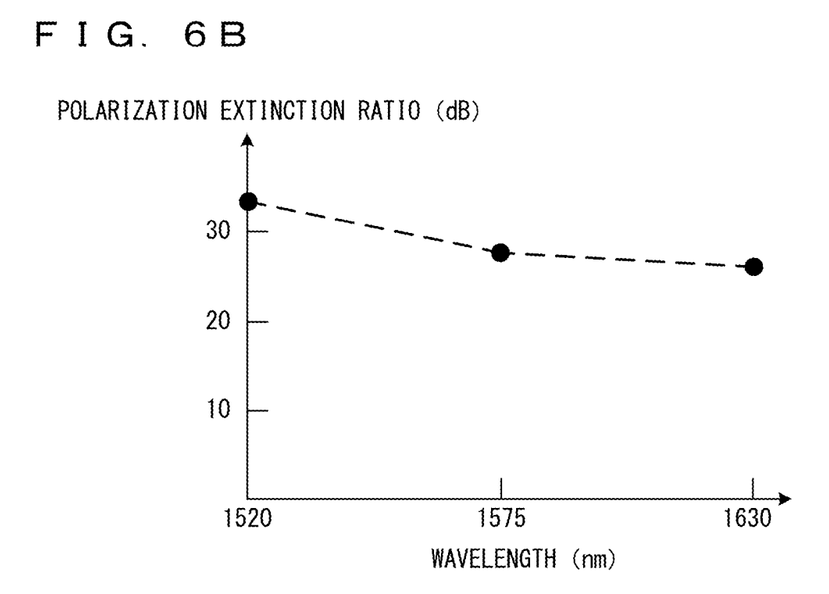

FIGS. 6A and 6B illustrate a simulation result for loss and polarization extinction ratio. This simulation is directed to the configuration depicted in FIG. 2A, wherein the length of the conversion section 2 (i.e., the length of the portion from the A-A cross section to the C-C cross section) is 60 μm, and the length of the light exit section 3 (i.e., the length of the portion from the C-C cross section to the D-D cross section) is 30 μm. A loss and a polarization extinction ratio pertaining to conversion from TE0-mode light to TM0-mode light are calculated in accordance with FDTD.

As indicated in FIG. 6A, the loss is less than or equal to 0.21 dB over a wavelength range of 110 nm that includes the C band and the L band. As depicted in FIG. 6B, a polarization extinction ratio of 25 dB or greater is obtained over the wavelength range of 110 nm. Accordingly, efficient polarization conversion is attained with a short device length.

In the optical waveguide device 1, as depicted in FIG. 2A, the shapes of the cross sections of the cores continuously change in the direction in which light propagates. If the cores have a discontinuous point, a large loss will be incurred due to light reflection. In a configuration with large reflection, oscillation of a laser light source may be unstable. Accordingly, embodiments of the present invention allow for reduced reflection and a decreased loss.

In the example depicted in FIG. 2A, when TE0-mode light is input to one waveguide (WG2) of the pair of waveguides, TM0-mode light will be output from the other waveguide (WG1). However, the present invention is not limited to this configuration. In particular, when TE0-mode light is input to one of the waveguides (e.g., WG2), TM0-mode light may be output from this waveguide (i.e., WG2). For example, the even mode of TM0 may be localized in the core 14 when the cross-sectional area of the core 14 at the output end of the optical waveguide device 1 (D-D cross section in FIG. 2A) is larger than the cross-sectional area of the core 13 at the output end. In this case, TM0-mode light can be obtained by coupling an isolated waveguide to the output end of the core 14.

In the example depicted in FIGS. 2A and 2B, the cores 11 and 12 are respectively provided with the slabs 11S and 12S. However, the present invention is not limited to this configuration. In particular, only either of the cores 11 and 12 may be provided with a slab. In addition, the cores 11 and 12 may each include slabs on both sides of the rib.

Variations

Figure 7:
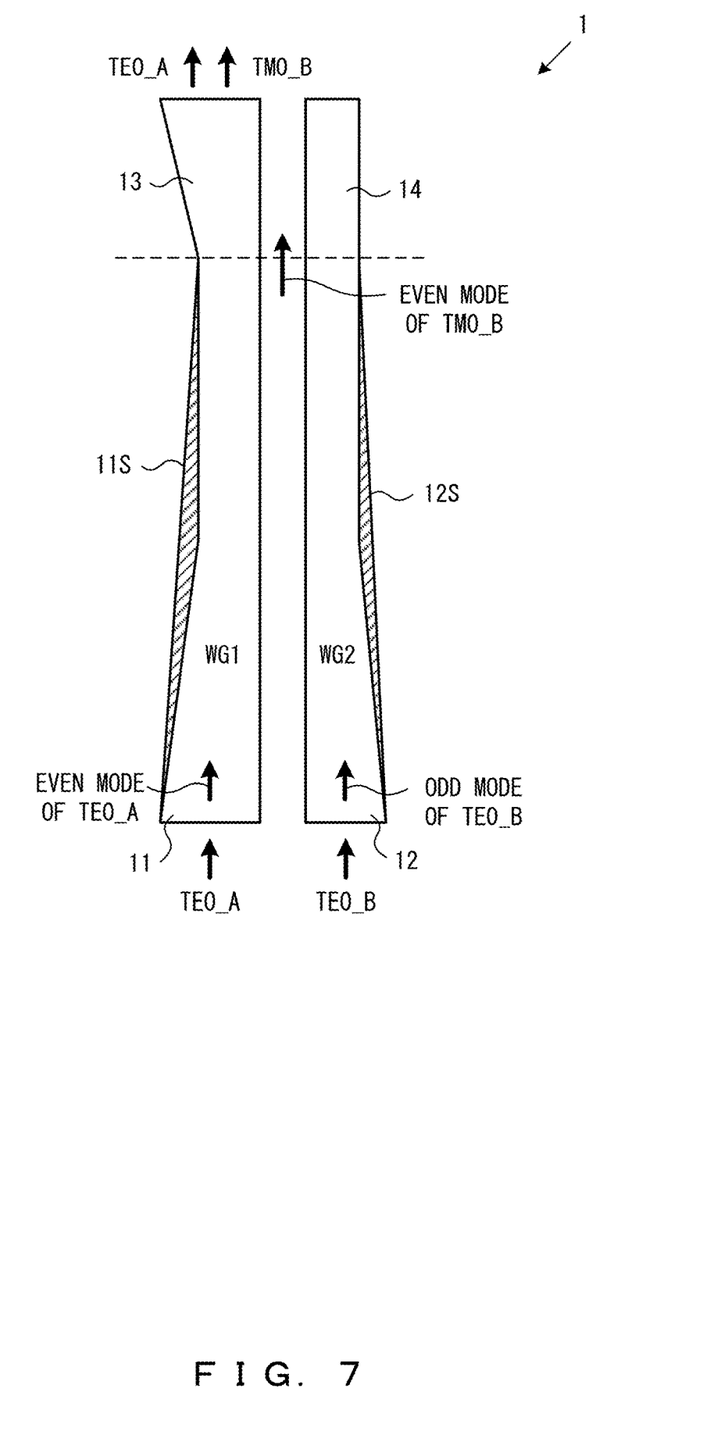
FIG. 7 illustrates a first variation of embodiments of the present invention.

FIG. 7 illustrates a first variation of embodiments of the present invention. In the first variation, the optical waveguide device 1 is used as a polarization multiplexer.

In the example depicted in FIG. 7, rays of TE0-mode light independent of each other are input to the cores 11 and 12. The TE0-mode light input to the core 11 and the TE0-mode light input to the core 12 are respectively denoted by "TE0_A" and "TE0_B." In this example, at the input end of the optical waveguide device 1, the core 11 has a larger cross-sectional area than the core 12. Thus, the even mode of TE0_A is propagated through the core 11, and the odd mode of TE0_B is propagated through the core 12.

As described above, the odd mode of TE0_B is converted into the even mode of TM0. Then, TM0-mode light (TM0_B) is output through the core 13. Meanwhile, over the entirety of the conversion section 2, the effective refractive index of the even mode of TE0 is not the same as the effective refractive index of another waveguide mode (the odd mode of TE0, the even mode of TM0). That is, interference does not occur between the even mode of TE0 and another waveguide mode. Hence, the TE0_A that propagates through the core 11 is output through the core 13 without being converted into another mode. As a result, multiplexing of the TE0 mode and the TM0 mode is implemented.

Figure 8:
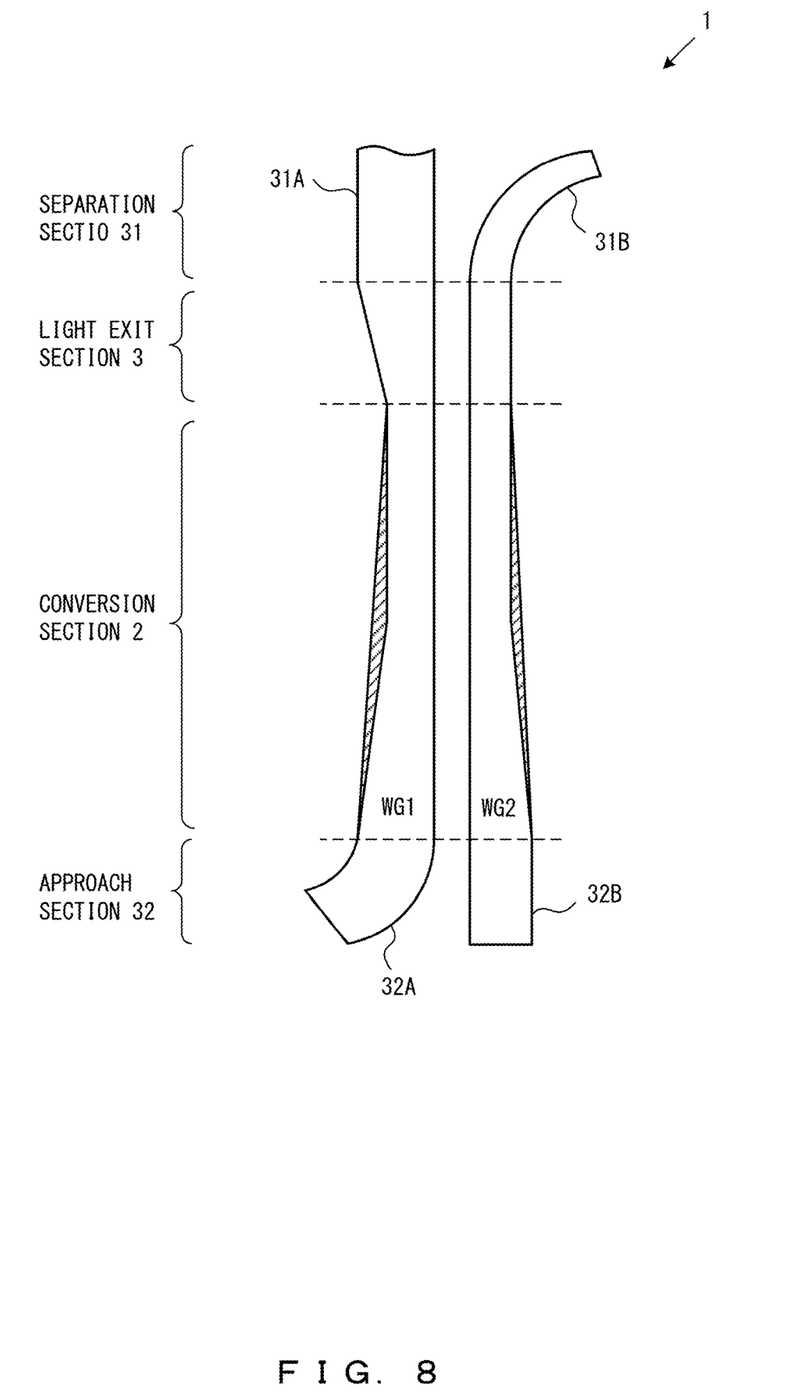
FIG. 8 illustrates a second variation of embodiments of the present invention.

FIG. 8 illustrates a second variation of embodiments of the present invention. In the second variation, the optical waveguide device 1 includes a separation section 31 and an approach section 32.

The separation section 31 is provided on the output sides of the waveguides WG1 and WG2 and includes waveguides 31A and 31B. The waveguide 31A is coupled to the waveguide WG1. The waveguide 31B is coupled to the waveguide WG2. The spacing between the waveguides 31A and 31B gradually becomes larger as the distance from the output ends of the waveguides WG1 and WG2 increases. In this example, the waveguide 31A is a linear waveguide, and the waveguide 31B is a curved waveguide. The curved waveguide is shaped like an arc, an S bend, or a relaxation curve such as a clothoid curve.

In the configuration described above, light output from the waveguide WG2 is reflected at the leading end of the waveguide 31B. In this case, noise may be generated. However, the leading end of the waveguide 31B is distant from the waveguide 31A though which TM0-mode light propagates. Hence, the influence of the noise on the TM0-mode light output from the optical waveguide device 1 is reduced.

The approach section 32 is provided on the input side of the waveguides WG1 and WG2 and includes waveguides 32A and 32B. The waveguide 32A is coupled to the waveguide WG1. The waveguide 32B is coupled to the waveguide WG2. The spacing between the waveguides 32A and 32B gradually becomes larger as the distance from the input ends of the waveguides WG1 and WG2 increases. In this example, the waveguide 32A is a curved waveguide, and the waveguide 32B is a linear waveguide.

The second variation is not limited to this configuration. For example, the optical waveguide device 1 may include either of the separation section 31 and the approach section 32. Both of the waveguides 31A and 31B may be curved waveguides, and both of the waveguides 32A and 32B may be curved waveguides.

Figure 9:
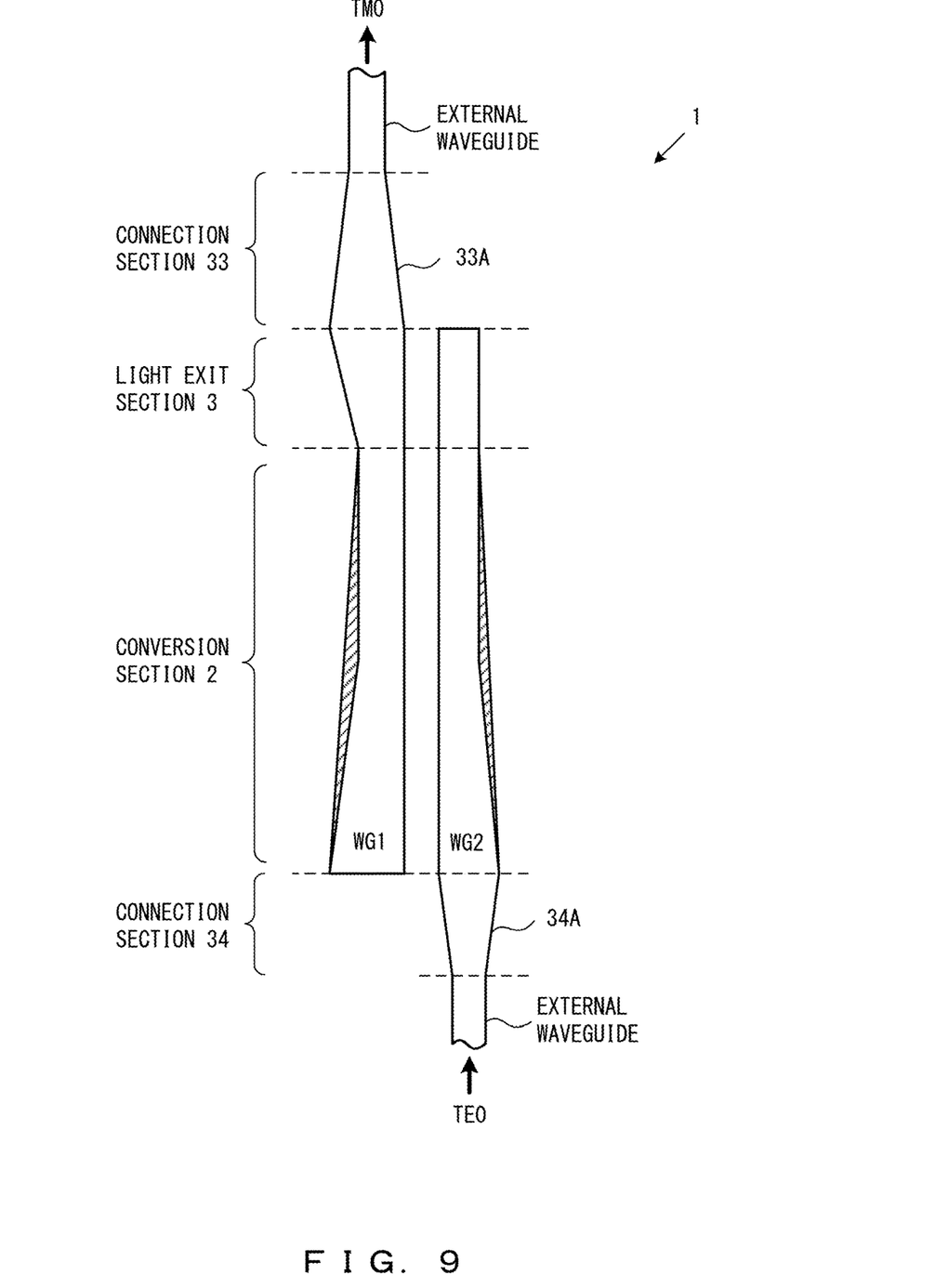
FIG. 9 illustrates a third variation of embodiments of the present invention.

FIG. 9 illustrates a third variation of embodiments of the present invention. In the third variation, the optical waveguide device 1 includes a connection section located between the optical waveguide device 1 and an external waveguide. In this example, TE0-mode light is input to the waveguide WG2, and TM0-mode light is output through the waveguide WG1.

The connection section 33 is provided between an external waveguide and the waveguide WG1 from which TM0-mode light is output. In this example, the external waveguide is a channel waveguide attaining strong confinement of light. The connection section 33 is implemented by an optical waveguide 33A. The width of the external waveguide is smaller than that of the waveguide WG1 at the output end. Thus, the cross-sectional shape of the optical waveguide 33A continuously changes in a tapered manner between the output end of the waveguide WG1 and the external waveguide.

The connection section 34 is provided between an external waveguide and the waveguide WG2 to which TE0-mode light is input. This external waveguide is also a channel waveguide. The connection section 34 is implemented by an optical waveguide 34A. The width of the external waveguide is smaller than that of the waveguide WG2 at the input end. Thus, the shape of the optical waveguide 34A continuously changes in a tapered manner between the external waveguide and the input end of the waveguide WG2.

Accordingly, in the third variation, the connection section 33 and/or the connection section 34 are/is provided such that there are no discontinuous points between the respective waveguides WG1 and WG2 and the external waveguides. As a result, a loss caused by reflection or the like is suppressed.

FIGS. 10A-10D illustrate a fourth variation of embodiments of the present invention. In the fourth variation, the optical waveguide device 1 includes an optical terminator 41 for removing or suppressing unnecessary light.

Figure 10A:
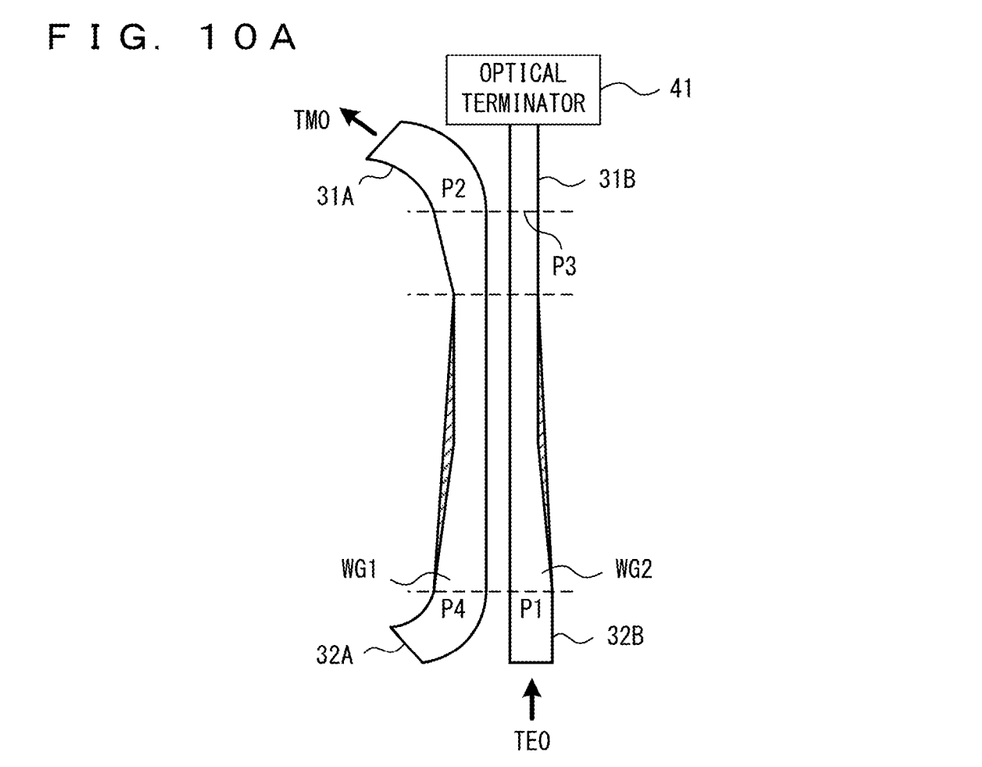
FIGS. 10A-10D illustrate a fourth variation of embodiments of the present invention.

In the optical waveguide device 1, when TE0-mode light is input to the waveguide WG2 through the port P1, the TE0 mode is converted into the TM0 mode, and TM0-mode light is output through the port P2. However, some of the input light components are output through the output end of the waveguide WG1 (i.e., through the port P3) as residual components. In this regard, if the optical terminator 41 is not provided, such residual components will be reflected by an end of the waveguide 31B and return to the waveguide WG2. The returning residual components will affect the characteristics of the optical waveguide device 1.

Accordingly, as depicted in FIG. 10A, the optical waveguide device 1 may include the optical terminator 41 at the leading end of the waveguide 31B. In this configuration, residual components output through the port P3 are terminated by the optical terminator 41, thereby suppressing reflection. Thus, providing the optical terminator 41 improves the characteristics of the optical waveguide device 1. When light is not input through the port P4, an optical terminator is also preferably provided at the port P4.

Figure 10B:
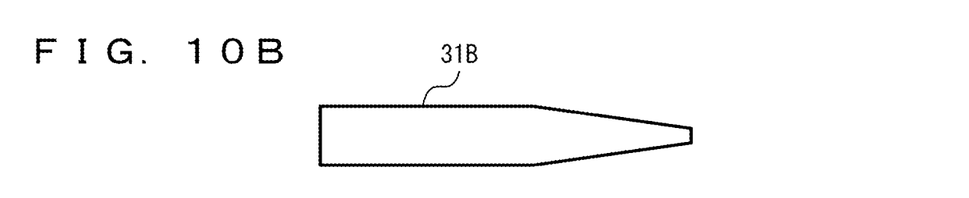
Figure 10C:
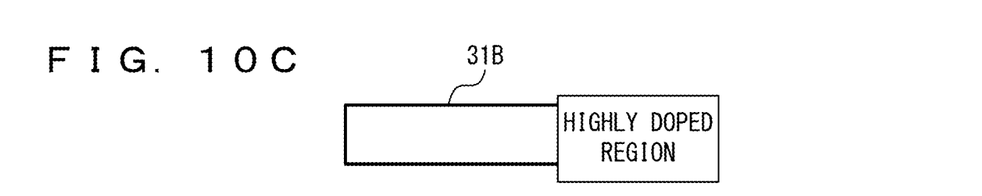
Figure 10D:
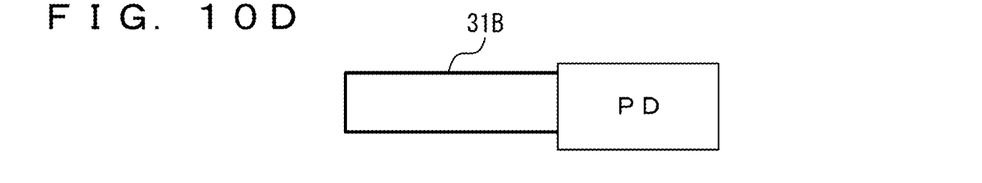

For example, the optical terminator 41 may be implemented by making the leading end of the waveguide 31B have a tapered structure, as depicted in FIG. 10B. In this case, the core of the waveguide 31B is formed to have a width that gradually decreases. The optical terminator 41 may also be implemented by highly doping the portion of the waveguide 31B close to the leading end with a light-absorptive material, as depicted in FIG. 10C. For example, the core of the waveguide 31B may be doped with a light-absorptive material. The light-absorptive material is not particularly limited and may be a publicly known material. Alternatively, the optical terminator 41 may be implemented by providing a photodetector such as a photodiode at the leading end of the waveguide 31B, as depicted in FIG. 10D. In this case, light arriving at the leading end of the waveguide 31B is converted into a current, thereby suppressing reflection.

In the embodiments described above, the cores are formed from Si, and the claddings are formed from SiO2. However, the present invention is not limited to this configuration. For example, both the cores and the claddings may be PLCs formed from SiO2. The waveguides WG1 and WG2 may be InP waveguides or GaAs waveguides. Alternatively, the waveguides may include a core formed from Si or SiN, a lower cladding formed from SiO2, and an upper cladding implemented by SiO2 or air.

Note that a Si waveguide has a large difference in refractive index between a core and a cladding and attains strong confinement of light, and thus has a small loss even in the case of a pattern with a small radius of curvature. Hence, in a case where a downsized optical circuit is required, using a Si waveguide may be preferable.

In the examples described above, the cross-sectional area of a core is adjusted by changing the width of the core. However, the cross-sectional area of a core may be adjusted by changing the height of the core or by changing both the width and height of the core. However, when the core of a waveguide is formed by lithography and etching, the width of the core is determined by the shape of a mask. Thus, a method that adjusts the cross-sectional area of a core by changing the width of the core will be a preferable method for preventing the fabrication process from being complicated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical waveguide device comprising:
   a pair of waveguides formed parallel to each other, wherein
   one of the pair of waveguides includes a first core formed in a conversion region and a third core formed in a light exit region,
   the other of the pair of waveguides includes a second core formed in the conversion region and a fourth core formed in the light exit region,
   a cross-sectional area of the first core and a cross-sectional area of the second core are different from each other at an input end of the conversion region,
   in at least a portion of a section between the input end and an output end of the conversion region, a distribution of a refractive index on a cross section of at least one of the first core and the second core is asymmetric in a direction perpendicular to a surface of a substrate on which the pair of waveguides are formed, a quantitative relation provided at the input end of the conversion region between an effective refractive index of an odd mode of TE0 and an effective refractive index of an even mode of TM0 is opposite to a quantitative relation provided at the output end of the conversion region between the effective refractive index of the odd mode of TE0 and the effective refractive index of the even mode of TM0, a structure of the first core and a structure of the second core each continuously change in a light traveling direction, a distribution of a refractive index on a cross section of the third core and a distribution of a refractive index on a cross section of the fourth core are each symmetric in the direction perpendicular to the surface of the substrate, a structure of the third core and a structure of the fourth core each continuously change in the light traveling direction, and a cross-sectional area of the third core and a cross-sectional area of the fourth core are different from each other at an output end of the light exit region.

2. The optical waveguide device according to claim 1, wherein
at any position between the input end and the output end of the conversion section, an effective refractive index of a TM0 mode in the first core assuming that the first core is isolated is lower than an effective refractive index of a TE0 mode in the second core assuming that the second core is isolated.

3. The optical waveguide device according to claim 1, wherein
at least either the first core or the second core includes a slab in at least a portion of the section between the input end and the output end of the conversion region.

4. The optical waveguide device according to claim 1, wherein
the first core and the second core are the same in height, and
a width of the first core and a width of the second core each continuously change in the light traveling direction.

5. The optical waveguide device according to claim 1, wherein
the third core and the fourth core each have a rectangular cross section.

6. The optical waveguide device according to claim 1, further comprising:
a separation section that includes a first waveguide coupled to an output end of the third core and a second waveguide coupled to an output end of the fourth core, wherein
a spacing between the first waveguide and the second waveguide becomes larger as a distance from the output ends of the third core and the fourth core increases.

7. The optical waveguide device according to claim 1, further comprising:
an approach section that includes a third waveguide coupled to an input end of the first core and a fourth waveguide coupled to an input end of the second core, wherein
a spacing between the third waveguide and the fourth waveguide becomes larger as a distance from the input ends of the first core and the second core increases.

8. The optical waveguide device according to claim 1, further comprising:
a connection section that includes a fifth waveguide coupled to an output end of a core that has a larger cross-sectional area among the third core and the fourth core, wherein
a width of the fifth waveguide continuously changes in a tapered manner in the light traveling direction.

9. The optical waveguide device according to claim 1, further comprising:
a connection section that includes a sixth waveguide coupled to an input end of a core that has a smaller cross-sectional area among the first core and the second core, wherein
a width of the sixth waveguide continuously changes in a tapered manner in the light traveling direction.

10. The optical waveguide device according to claim 1, wherein
an optical terminator is provided at an output end of a core that has a smaller cross-sectional area among the third core and the fourth core.

* * * * *